United States Patent
Stählin et al.

(10) Patent No.: US 8,897,926 B2
(45) Date of Patent: Nov. 25, 2014

(54) METHOD FOR CONTROLLING A MOTOR VEHICLE AND DEVICE THEREFOR

(75) Inventors: Ulrich Stählin, Eschborn (DE); Jürgen Diebold, Eschborn (DE)

(73) Assignee: Continental Teves AG & Co. oHG (DE)

( * ) Notice: Subject to any disclaimer, the term of this patent is extended or adjusted under 35 U.S.C. 154(b) by 842 days.

(21) Appl. No.: 13/125,079

(22) PCT Filed: Oct. 16, 2009

(86) PCT No.: PCT/EP2009/063561
§ 371 (c)(1),
(2), (4) Date: Apr. 20, 2011

(87) PCT Pub. No.: WO2010/046315
PCT Pub. Date: Apr. 29, 2010

(65) Prior Publication Data
US 2011/0245992 A1    Oct. 6, 2011

(30) Foreign Application Priority Data
Oct. 21, 2008  (DE) .......................... 10 2008 043 016

(51) Int. Cl.
| | | |
|---|---|---|
| G05D 1/00 | (2006.01) | |
| B60W 50/08 | (2012.01) | |
| B60T 8/1755 | (2006.01) | |
| B62D 6/00 | (2006.01) | |
| B62D 5/04 | (2006.01) | |
| B62D 7/15 | (2006.01) | |
| B60W 30/00 | (2006.01) | |

(52) U.S. Cl.
CPC ............ B60W 50/085 (2013.01); B60T 8/1755 (2013.01); B62D 6/003 (2013.01); B62D 5/0463 (2013.01); B62D 7/159 (2013.01); B62D 6/008 (2013.01); B60W 30/00 (2013.01)
USPC ................................... 701/1; 701/41; 701/42

(58) Field of Classification Search
CPC ....... B60T 8/173; B60T 8/174; B60T 8/1755; G07C 5/008; B60R 16/0231; B60R 16/0232; B60G 17/0195; B62D 5/0463; B62D 7/159; B62D 6/008; B62D 6/003
USPC ................. 701/36, 45, 1, 41, 532, 42, 48, 97; 180/170, 271, 169; 704/275, E11.001; 382/103; 365/189.15; 104/284; 172/3, 172/1
See application file for complete search history.

(56) References Cited

U.S. PATENT DOCUMENTS

| | | |
|---|---|---|
| 5,307,891 A | 5/1994 | Shaw et al. |
| 2004/0020698 A1* | 2/2004 | Gehrke et al. ................ 180/170 |

(Continued)

FOREIGN PATENT DOCUMENTS

| | | |
|---|---|---|
| CN | 1704861 | 12/2005 |
| DE | 10 2005 047 591 | 4/2007 |

(Continued)

OTHER PUBLICATIONS

German Search Report corresponding to DE 10 2009 045 760.7, dated Jun. 25, 2013.

(Continued)

*Primary Examiner* — Behrang Badii
(74) *Attorney, Agent, or Firm* — RatnerPrestia

(57) ABSTRACT

A method for controlling a motor vehicle wherein the control is carried out with the participation of at least one driver assistance system. In order to simplify and/or differentiate the overriding of a driver assistance system, there is provision that the participation of at least part of the at least one driver assistance system in the control of the motor vehicle is switched off or changed by the driver activating an activation element which is provided in and/or on the motor vehicle and communicates with the at least one driver assistance system. A corresponding device is also described.

13 Claims, 1 Drawing Sheet

(56) References Cited

U.S. PATENT DOCUMENTS

| | | |
|---|---|---|
| 2005/0203685 A1* | 9/2005 | Kopf et al. .................. 701/36 |
| 2005/0270145 A1 | 12/2005 | Kataoka et al. |
| 2005/0274563 A1 | 12/2005 | Ahnafield |
| 2007/0203617 A1* | 8/2007 | Haug ............................. 701/1 |
| 2007/0213905 A1* | 9/2007 | Funk et al. .................... 701/45 |
| 2008/0141820 A1 | 6/2008 | Park et al. |
| 2009/0198414 A1 | 8/2009 | Mohning et al. |
| 2010/0280710 A1* | 11/2010 | Staempfle et al. .............. 701/36 |
| 2011/0187516 A1 | 8/2011 | Makinen et al. |

FOREIGN PATENT DOCUMENTS

| | | |
|---|---|---|
| EP | 1355209 | 10/2003 |
| WO | 2005063523 | 7/2005 |
| WO | 2007107360 | 9/2007 |

OTHER PUBLICATIONS

Chinese Office Action correspond to CN 200980141755.0 dated Jul. 1, 2013.

International Search Report for PCT/EP2009/063561 mailed May 4, 2010.

* cited by examiner

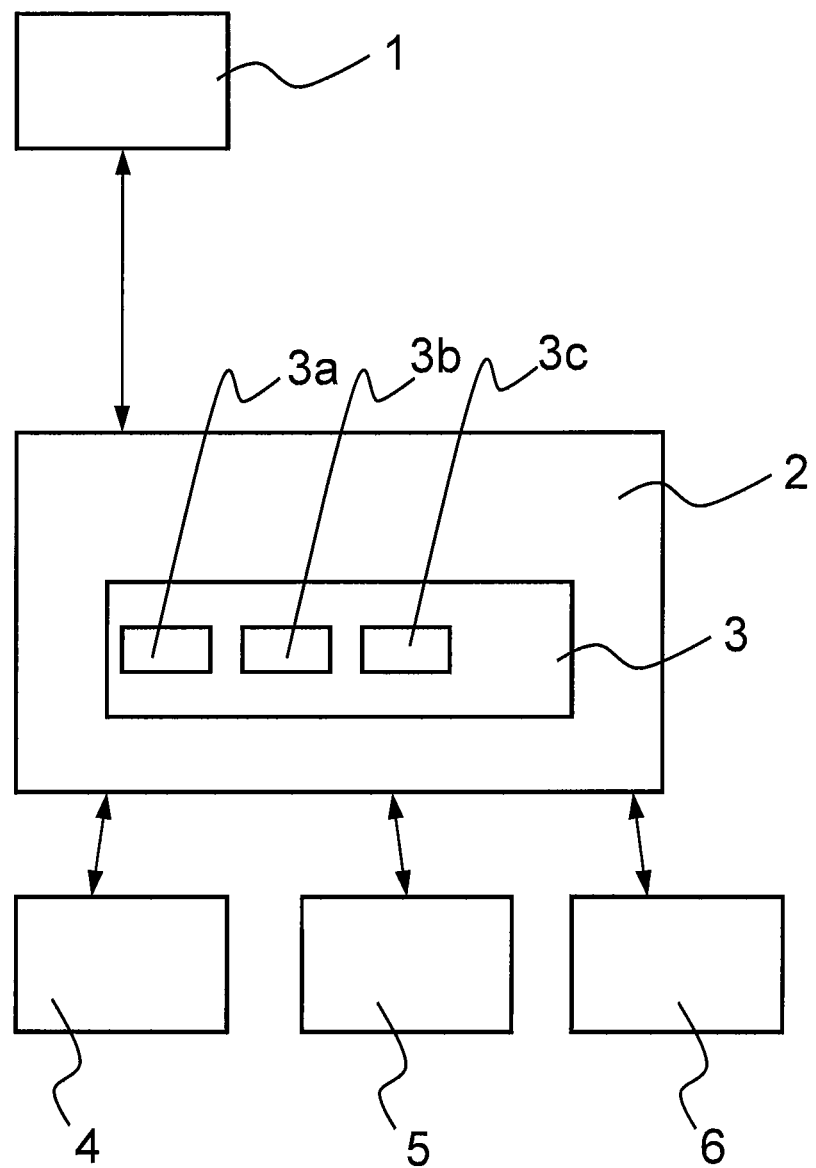

METHOD FOR CONTROLLING A MOTOR VEHICLE AND DEVICE THEREFOR

CROSS REFERENCE TO RELATED APPLICATIONS

This application is the U.S. national phase application of PCT International Application No. PCT/EP2009/063561, filed Oct. 16, 2009, which claims priority to German Patent Application No. 10 2008 043 016.1, filed Oct. 21, 2008, the contents of such applications being incorporated by reference herein.

FIELD OF THE INVENTION

The present invention relates to a method for controlling a motor vehicle, wherein the control is carried out with the participation of at least one driver assistance system. The invention also relates to a corresponding device.

BACKGROUND OF THE INVENTION

Control processes for motor vehicles according to the present state of the art are frequently carried out with the participation of what are referred to as driver assistance systems (Advanced Driver Assistance Systems, ADAS). These are devices which assist the driver of a motor vehicle in certain driving situations. Examples of such driver assistance systems are an adaptive cruise control (ACC) system, an anti-lock brake system (ABS), an electronic stability program (ESP), an adaptive headlight assistant (automatic adaptation of the beam width of the dipped headlight and adjustment of the headlight between full beam and dipped beam), a braking assistant (BRS), a hill starting assistant, a cruise control system, an inter-vehicle distance warning system, a blind spot monitoring system, a traffic jam assistant, a lane detection system, a lane change assistant, a driver state detection system, a collision warning and protection system (Collision Mitigation (Brake) System, CM(B)S) or a traffic sign recognition system.

Assistance is provided to the driver by a driver assistance system usually on the basis of safety considerations or in order to increase the driving comfort. Driver assistance systems usually intervene autonomously in the drive, steering system and/or signaling devices of the vehicle.

Nowadays, the intervention by a driver assistance system in the drive, steering system and/or signaling devices can typically be overridden by the driver clearly perceptively counteracting the intervention by the ADAS. In this context, "overriding" is understood to be an action which prevents or at least changes the intervention by the driver assistance system. The possibility of overriding is provided for legal reasons since the driver must be able to assume responsibility for the steering of his motor vehicle at any time. In addition, some systems do not yet operate so reliably. This concerns, in particular, the detection of the surroundings in all possible driving states and all possible weather conditions. In addition, the acceptance of systems which do not take away control from the driver is greater.

However, the possibilities of overriding a driver assistance system are currently limited or difficult to differentiate from actions by the driver which are not intended to bring about overriding of a driver assistance system.

When a collision warning and protection system is working, for example significant acceleration after a warning has been issued would be interpreted as overriding of the system. The intervention by the system would be interrupted in the controller. The acceleration by the driver could, however, also have taken place due to the driver being startled, and therefore in this case the overriding of the system would have taken place unintentionally.

In addition, given the increasing number of driver assistance systems on board a motor vehicle there is the risk of actions by the driver being incorrectly interpreted in relation to a driver assistance system or being assigned to the wrong driver assistance system. This can also lead to undesired overriding of the system.

A further disadvantage of known overriding possibilities for driver assistance systems is that the overriding cannot be differentiated. There is frequently only the possibility of switching off the intervention by the system. The degree of the intervention can, for example, not be reduced by current overriding variants.

SUMMARY OF THE INVENTION

An object of the present invention is therefore to specify a method which facilitates the overriding of a driver assistance system for the driver, and permits this to be configured in a more differentiated way and improved in terms of its accuracy. The object is also to provide a corresponding device.

The above or other objects may be achieved by means of a method in which the participation of at least part of the at least one driver assistance system in the control of the motor vehicle is switched off or changed by the driver activating an activation means which is provided in and/or on the motor vehicle and communicates with the at least one driver assistance system.

The advantage of the method according to aspects of the invention is that the activation means provide the driver with possibilities for intervening in the operation of a driver assistance system or overriding said driver assistance system, which are very simple and which can be differentiated. By means of various activation means (HMI (Human Machine Interaction) elements, see exemplary embodiments), the driver is provided with the possibility of overriding interventions by the ADAS or of influencing said interventions in a different way. These additional overriding possibilities can be combined with the possibilities which are customary today. In addition, various activation means can also be combined with one another.

The inventors have recognized that modern vehicles make available a large number of activation means for driver requests which have, however, hitherto not been used for overriding driver assistance systems. The totality of these means can now be used to influence the operation of the driver assistance systems.

For example, a driver assistance system can not only be switched off by means of an activation means but can, for example, also alternatively be switched over into a different mode. For example, a position of the activation means could signify that a mode of the driver assistance system in which internal variables of the driver assistance system are displayed, for example the current risk estimation in a collision warning and protection system or a bird's eye view of the current situation in a lane change assistant, is switched on. The possibilities just mentioned can be used, for example, to provide better instruction to people learning to drive and/or to accustom them more quickly to the system. However, the method according to aspects of the invention can also be used to enable individuals to familiarize themselves more quickly with a new vehicle or to understand better how the system functions. This has the advantage that the acceptance of the system becomes greater because the driver does not feel that the system is "imposed on him" but rather can influence the system.

In another example of switching over between modes, switching over occurs from the "lane departure warning" mode to the "lane keeping" mode, that is to say from warning to action by the respective driver assistance system. Generally, "switching over into another mode" means that a driver assistance system is switched over from one type of action or reaction into another within the control of the motor vehicle. Consequently, when switching over between modes occurs, the participation of at least part of the at least one driver assistance system in the control of the motor vehicle is changed.

By means of the activation means it is also possible to configure a driver assistance system in such a way that it reacts with different levels of "aggressivity". This means that the time of intervention of the driver assistance system is changed. As a result, the ADAS can be adapted to the driver's habits.

If it is unclear which ADAS should react to the operator control element, it is possible either to determine that all the driver assistance systems present in the respective vehicle react, or it is possible to determine that in the case of overriding the only driver assistance system to react is one in which other methods (for example strong acceleration, steering instead of straight-ahead travel or other interruption criteria) would also then be activated.

The activation element or elements can also be embodied in such a way that it is possible to carry out switching over in an annular shape between the respective modes of the driver assistance system or multiple driver assistance systems which are installed in the respective motor vehicle. Alternatively or additionally, the switching over can be combined with a selection wheel etc.

Overall, in one preferred embodiment of the present invention the activation element is embodied in such a way that it can change or switch off both the participation of at least one driver assistance system or of a plurality of driver assistance systems. It is advantageous if the activation element carries out one of the two tasks as a function of the driving situation. In this context, for example, driving situation is understood to mean the differentiation between town/country road/freeway or high/medium/low velocity or single lane/multiple lane/multiple lane with separated-off oncoming roadway or commuter lane/individual lane or other ambient parameters.

In this context, the changing of the participation of the respective driver assistance system includes the fact that when the activation means are activated the degree of participation of at least part of the driver assistance system in the control of the motor vehicle is changed (for example a change of mode is carried out and/or the type and/or the scope of the driver interaction and/or the driver information of the driver assistance system is changed. This can also include the fact that, for example, further resources for controlling the motor vehicle are made available to the driver by means of a corresponding display. Such resources can comprise, for example, the display of internal variables of the driver assistance system, with the result that further decision possibilities or possibilities for the correct assessment of the driving situation are offered to the driver.

The method according to aspects of the invention can be configured in such a way that if the vehicle is currently not in a state which can or has to be overridden, the degree of participation of the ADAS in the control of the motor vehicle is preferably changed, and in all other cases the driver assistance system is switched off.

In one preferred exemplary embodiment of the method according to aspects of the invention, an operator control element, preferably a pedal, a joystick, a wheel, a pushbutton key and/or a switching rocker, is activated as the activation means. This activation means can be implemented cost-effectively for a motor vehicle and can be operated by the driver in a simple and usually intuitive way.

For example, when a pedal is used as the activation means, such a pedal can be provided instead of the clutch pedal since a clutch pedal is absent in motor vehicles with an automatic transmission, a double clutch transmission or automated variable speed transmission or in hybrid vehicles which customers are finding increasingly desirable. Therefore, such an activation means does not have to be configured in a fundamentally new way.

Alternatively or additionally, an activation means can be activated by means of a voice communication and/or mimic communication which is generated by the driver. Such activation of an activation means has the advantage that it does not distract the driver's attention from the roadway. In addition, this activation means permits very differentiated activation and therefore also differentiated overriding of the respective driver assistance system.

In a further exemplary embodiment of the method according to aspects of the invention, the activation of the activation means takes the form of a movement of the steering wheel which is different from the steering movement. Such activation usually takes place intuitively.

The above or other objects may also be achieved by means of a device for controlling a motor vehicle, in which device an activation means is provided in and/or on the motor vehicle, which activation means communicates with the at least one driver assistance system, wherein the at least one driver assistance system is configured in such a way that, when the activation means is activated by the driver, the participation of at least part of the at least one driver assistance system in the control of the motor vehicle can be switched off or changed.

The device according to aspects of the invention and the preferred embodiments thereof which are described herein may have the advantages which are specified above in relation to the method according to aspects of the invention.

Further features, advantages and application possibilities of the present invention can also be found in the following description of exemplary embodiments of the method according to aspects of the invention and the device according to aspects of the invention with reference to a figure. Here, all the features shown or described form in themselves, or in a desired combination, the subject matter of the present invention.

BRIEF DESCRIPTION OF THE DRAWINGS

The invention is best understood from the following detailed description when read in connection with the accompanying drawings. Included in the drawings is the following figure.

FIG. 1 shows an exemplary embodiment of the device according to aspects of the invention.

DETAILED DESCRIPTION OF THE PREFERRED EMBODIMENTS

In a first exemplary embodiment of the invention, a pedal (left-hand pedal, referred to below as ADAS pedal) 1 can be used as an activation element instead of a clutch pedal. This pedal 1 then serves to override interventions of at least one or more driver assistance systems installed in the respective motor vehicle.

For this purpose, the pedal 1 is connected to the control device 2 of the motor vehicle. In motor vehicles in which a clutch pedal is needed, a pedal can also be provided at another location in the motor vehicle. A possible and favorable location would be, for example, to the left of the clutch pedal in this case.

Such an ADAS pedal can additionally be combined with the previously used methods for detecting overriding in order to make the method even more safe.

Ideally, the ADAS pedal 1 is embodied in such a way that in its position of rest and in its pedal travel as well as in its pedal characteristic it differs clearly from a clutch pedal, in order to make the adjustment when changing over from a motor vehicle with a clutch pedal to a motor vehicle with an ADAS pedal 1 as easy as possible. For example, such an ADAS pedal could move less easily and have a shorter operating travel than a clutch pedal. If appropriate, it is possible to provide a release mechanism (not illustrated) by means of which the driver does not release the ADAS pedal 1 (similar to a parking brake) until it can be used. As a result, the fault rate when using the ADAS pedal 1 is reduced.

In one preferred embodiment, the ADAS pedal 1 could be implemented in the form of a knob on the floor panel.

If a collision warning and protection system 3*a* is used as one of a plurality of driver assistance systems 3 which are integrated into the control device 2, the situation can arise in which the system 3*a* warns the driver about an imminent collision by means of a display device. However, the driver is driving in a very sporty way and sees a gap which he can use to make an avoidance maneuver. For this reason, he activates the operator control element (for example the ADAS pedal 1) in order to override the collision warning and protection system 3*a* and then prevents the accident by means of an avoidance maneuver. In this case, the control device 2 detects, by communication with the ADAS pedal 1, that the collision warning and protection system 3*a* is to be overridden by the activation of the pedal 1. The control device 2 accordingly does not output any further messages via the display 4 and also does not initiate braking by means of the brake system 5. The steering system 6 is also not influenced by the control device 2 beyond the normal degree or only in order to assist the avoidance process.

Further driver assistance systems 3 which can be integrated into the controller 2 are, for example, a parking assistant 3*b* and a lane change assistant 3*c*.

In a second exemplary embodiment of the present invention, the driver can influence the driver assistance systems 3 installed in the motor vehicle by means of a mimic recognition system and/or a voice recognition system. In particular, in this context the voice recognition system also facilitates the assignment to one of the systems, for example the parking assistant 3*b*, since the latter can be specified by voice, in the specified case by, for example, "parking assistant". In this exemplary embodiment, the activation element (instead of the pedal 1) is therefore embodied as a camera and image recognition system for mimic recognition or as a receiver and voice recognition system for the voice recognition process.

In a third exemplary embodiment, a pressure-sensitive steering wheel can be used as the activation element (instead of the pedal 1). In order to detect the change in the pressure acting on the steering wheel, a capacitively operating sensor is used. If a change in the pressure which is not due to panic is detected at the steering wheel, this is interpreted as an overriding request. For differentiated setting of the intervention in a driver assistance system, a pressure-sensitive steering wheel can, however, only be used to a limited degree. This exemplary embodiment can therefore advantageously be combined with the fourth exemplary embodiment described below.

In the fourth exemplary embodiment of the present invention, the characteristic of the respective ADAS 3*a*, 3*b*, 3*c* can be adjusted by means of a steering wheel which can be adjusted in a plurality of planes (for example in two planes) (steering wheel rim distance from the driver), as an activation element and/or by means of a lever/ring behind the steering wheel which can be adjusted in a plurality of planes, as an activation element (each instead of the pedal 1), in that in each case a changeover into a different plane is performed. It is therefore possible, for example, for a first plane (near to the driver) to include defensive/comfortable behavior of the driver assistance system with corresponding early warnings/interventions, for a second plane (center position) to include neutral behavior and for a third plane (furthest away from the driver) to include aggressive/dynamic behavior with later warnings/interventions. However, the exemplary embodiment is not restricted to three planes or permanently prescribed, and the sequence with respect to the driver can be reversed. Alternatively or additionally, interventions can be overridden by means of such a change of plane. This exemplary embodiment can be used particularly advantageously for driver assistance systems which influence the steering of the motor vehicle.

In a fifth exemplary embodiment of the invention, a differentiation can be made, for example, between early, i.e. comfortable, and late, i.e. aggressive, interventions in the respectively selected driver assistance systems 3*a*, 3*b*, 3*c* by means of a central joystick as the activation element (instead of the pedal 1) for the intervention in the driver assistance systems (referred to below as ADAS joystick). Likewise, with an ADAS joystick it is very easily possible to adapt parameters of the respective ADAS 3*a*, 3*b*, 3*c*. For example, the strength of braking in the case of the collision warning and protection system 3*a* can be set. However, the ADAS joystick is suitable for overriding only if it is correspondingly easy to reach and is arranged in the driver's immediate activation range.

In a sixth exemplary embodiment, interventions of driver assistance systems 3*a*, 3*b*, 3*c* can be overridden and/or the respective driver assistance systems 3*a*, 3*b*, 3*c* installed in the vehicle can be adapted to the driver's requirements in terms of the parameters, by means of simple operator control elements such as, for example, steering wheel pushbutton keys or switching rockers (instead of the pedal 1). For these operator control elements to be capable of being used for overriding an ADAS 3*a*, 3*b*, 3*c*, said operator control elements must be correspondingly easy to reach and must be arranged in the driver's immediate activation range.

In the text which follows, three further examples are illustrated as to how the activation elements described above can be used in a specific way in the control of a motor vehicle with at least one driver assistance system 3*a*, 3*b*, 3*c*. Here, it is possible, if appropriate, for each of the activation elements described above to be used.

In the case of a lane change assistant 3*c*, the current position relative to the lane is indicated by means of the display device 4 as a birds-eye view after activation of an operator control element, for example by pressing a steering wheel pushbutton key (possibly until the pushbutton key is pressed next), (instead of the pedal 1). As a result, the driver can maneuver better in tight situations.

In the case of a collision warning and protection system 3*a*, the respective current hazard level is indicated after a voice input, for example utterance of "ADAS display" by the display device 4 in the case of normal travel. In addition, it is possible to indicate which object in the surroundings is the currently relevant object or the most hazardous object.

In the case of a lane change assistant 3c, after an operator control element has been activated (for example the plane at the steering wheel has been switched over), switching over occurs from the mode in which only a warning is issued when the lane is exited, to the lane keeping mode in which the vehicle is kept automatically within the lane, for example by steering interventions.

The invention claimed is:

1. A method for controlling a motor vehicle, wherein the control is carried out with the participation of at least one driver assistance system, wherein the participation of at least part of the at least one driver assistance system in the control of the motor vehicle is switched off or changed by the driver activating an activation means which is provided in and/or on the motor vehicle and communicates with the at least one driver assistance system, wherein the activation of the activation means takes the form of a movement of the steering wheel which is different from a steering movement.

2. The method as claimed in claim 1, wherein an operator control element is activated as the activation means.

3. The method as claimed in claim 2 wherein the operator control element is a pedal, a joystick, a wheel, a pushbutton key a switching rocker or a combination thereof.

4. The method as claimed in claim 1, wherein when the activation means is activated, the degree of participation of at least part of the at least one driver assistance system in the control of the motor vehicle is changed.

5. The method as claimed in claim 1, wherein the participation of at least part of the at least one driver assistance system in the control of the motor vehicle is changed by virtue of the fact that further resources for controlling the motor vehicle are made available to the driver by means of a corresponding display.

6. A device for controlling a motor vehicle which operates with automatic participation of at least one driver assistance system, comprising an activation means provided in and/or on the motor vehicle, which activation means communicates with the at least one driver assistance system wherein the at least one driver assistance system is configured in such a way that, when the activation means is activated by the driver, the participation of at least part of the at least one driver assistance system in the control of the motor vehicle can be switched off or changed, wherein the activation of the activation means takes the form of a movement of the steering wheel which is different from a steering movement.

7. The device as claimed in claim 6, wherein the activation means is embodied as an operator control element 8. The device as claimed in claim 7, wherein the operator control element is a pedal, joystick, wheel, pushbutton key, switching rocker or a combination thereof.

9. The device as claimed in claim 6, wherein the activation means is embodied as a voice recognition system and/or mimic recognition system.

10. The device as claimed in claim 6, wherein the activation means is embodied as a steering wheel, wherein the activation takes the form of a movement of the steering wheel which is different from the steering movement.

11. The device as claimed in claim 6, wherein the at least one driver assistance system is configured in such a way that, when the activation element is activated, the degree of participation of at least part of the at least one driver assistance system in the control of the motor vehicle can be changed.

12. The device as claimed in claim 6, wherein the at least one driver assistance system is configured in such a way that the participation of at least part of the at least one driver assistance system in the control of the motor vehicle can be changed by virtue of the fact that further resources for controlling the motor vehicle are made available to the driver by means of a corresponding display which is output by a display device.

13. The method as claimed in claim 1, wherein the activation of the activation means takes the form of a movement of the steering wheel which is different from a rotational movement of the steering wheel.

\* \* \* \* \*